Jan. 30, 1940.   J. T. LITTLETON ET AL   2,188,608
KILN
Filed Oct. 7, 1937
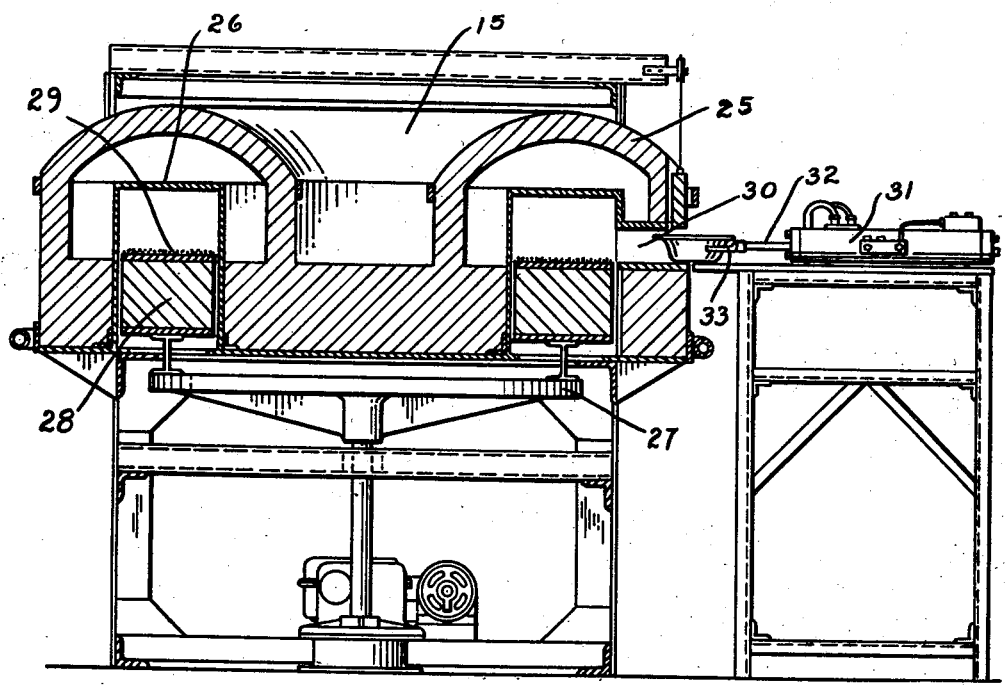
Inventors
J. T. Littleton
H. R. Lillie
W. W. Shaver
Dussy Cole & Garner Attorneys Patented Jan. 30, 1940

2,188,608

UNITED STATES PATENT OFFICE 2,188,608

KILN

Jesse T. Littleton, Howard R. Lillie, and William W. Shaver, Corning, N. Y., assignors to Corning Glass Works, Corning, N. Y., a corporation of New York Application October 7, 1937, Serial No. 167,840

5 Claims. (Cl. 49—45)

This invention is a continuation in part of our co-pending application filed September 24, 1935, Serial No. 41,930, and has for its object the production of articles of tempered glass possessing great thermal and mechanical strength and capable of retaining such strength after being subjected to elevated temperatures.

The principal object of this invention is a structure in which glassware may be heated to high temperatures without damage to the glass surface in contact with its support.

A further object of this invention is to produce tempered glassware having perfect surfaces capable of sustaining high degrees of permanent and temporary stress during the tempering operation so that high permanent strain may be finally introduced into the article. In accomplishing this, consideration must be given to the "softening point", "annealing point", and "strain point" of the particular glass subjected to the tempering.

Softening point, as used herein, is that condition in which glass has a viscosity of $10^{7.6}$ poises; annealing point is that condition in which glass has a viscosity of $10^{13.4}$ poises; and strain point is that condition in which glass has a viscosity of $10^{14.6}$ poises. We also use the expression softening temperature, annealing temperature, and strain temperature as defining the temperature at which any glass attains the viscous condition above recited.

In tempering glass it is necessary to first reduce its viscosity to a condition below its annealing point or $10^{13.4}$ poises and preferably near to its softening point, i. e., about $10^{7.6}$ poises. This is usually accomplished by heating the glass, the temperature being governed by the constituents entering into its composition. After reducing the viscosity of the glass, it is subjected to a sudden stiffening treatment by which its rigidity is restored. This is usually accomplished by chilling it to a temperature several hundred degrees below that to which it was previously heated.

The invention embodies employing a finely divided, water soluble highly refractory substance upon which the glassware is supported while being heated.

The drawing which forms a part of this specification is a vertical sectional view through a kiln embodying the present invention.

In producing tempered glassware the glass is melted and shaped to desired form by conventional methods and apparatus. Such ware is then brought to a uniform temperature condition by being placed in a temperature equalizing kiln maintained at a temperature very near to or above the softening temperature of the glass from which the articles are made. The glass articles in the kiln having reached a suitable temperature, which should be above the annealing temperature and approaching the softening point and is preferably as high as may be without resulting in loss of shape, are then removed from the kiln and introduced into a chilling medium which may be a molten salt bath or other well known chilling medium. This treatment causes a sudden hardening or stiffening of the glass with an attendant increase of viscosity and introduces tensional and compressional strains in the glass which contribute greatly to its thermal endurance and resistance to mechanical shock.

After chilling the glass in the molten salt bath above described, the articles may be delivered into a water bath for washing by which any salt or other substance which may adhere to them is dissolved and removed. This water bath is preferably maintained at about room temperature so that the articles are subjected to a thermal shock test and any articles which have been improperly tempered, or are otherwise defective, will break while those possessing the correct distribution of temper will remain intact.

After washing in water as above described, the articles may be transferred to a steam bath in a suitable housing in which their temperature is raised to a degree where they will quickly dry after being delivered onto an inspection belt along which they travel to be packaged ready for shipment and distribution.

The illustrated temperature equalizing kiln 15 consists of a circular tunnel 25 of refractory brick within which is supported a muffle 26. This muffle consists of an inverted transversely U-shaped circular housing made from an alloy containing about 30% chromium and 20% nickel and sold under the trade-name "Allegheny Metal No. 44". Mounted on the table 27 which rotates about the vertical axis of the kiln 15 below the tunnel 25 is a refractory ring 28 which closes the lower open end of the muffle 26 and supports the ware while it remains in the kiln to be heated. It will be understood, of course, that the tunnel 25 is provided with ports through which suitable burners (not shown) are introduced in order to maintain the interior of the muffle 26 at the desired temperature. The ring 28 is covered with a layer of soft, finely pulverized water soluble refractory material 29 which will serve to prevent the heated glass from sticking to it, and which by means of its soft character will not scratch or injure the surface of the softened glass. Experiments have disclosed that at the temperatures employed, the pulverized refractory material used on the ring must possess a high degree of refractoriness at the temperatures employed and must be soft and non-abrasive and soluble in water. Alumina, talc, clay, etc., have been used in the past to prevent the sticking of glass to heated refractories, but such materials are not soluble in water and hence are not suitable for the present purpose. The most satisfactory materials which we have found to prevent the ware from sticking to the ring 28 are sodium sulphate ($Na_2SO_4$), magnesium sulphate ($MgSO_4$), and potassium sulphate ($K_2SO_4$), each of which possesses the attribute of softness and solubility in water and will leave the articles deposited on the ring free from surface imperfections.

In order to introduce the ware into the muffle 26, the tunnel 25 is provided with an opening for the reception of the walls of a passage 30 which opens into the muffle and near which is mounted an air cylinder 31 the piston of which is connected to a piston rod 32 carrying at its outer end a substantially V-shaped head 33 which is adapted to engage an article as it is delivered either by the press attendant or the conveyor 14 to a position in front of the passage 30, and push the article into the kiln and onto the ring 28 by which it is carried around to an exit where it is withdrawn from the interior of the kiln.

The introduction of the articles into the steam bath not only raises their temperature to a point where rapid drying takes place but also serves as a rinsing bath to remove all traces of salt or other residue which may remain after washing in the water washing bath.

After thus finally rinsing and raising the temperature of the articles to the point where rapid evaporation of any moisture remaining on them takes place, they are deposited onto the inspection belt and are presented to the inspectors and packers in a clean and sanitary condition for packaging and distribution.

While in the foregoing one embodiment of our invention has been shown and described in connection with the tempering of glassware, it is to be understood that our structure is equally useful in the performance of any glass working process in which finished glassware is raised to a high temperature and that minor changes in the details of construction, combination and arrangement of parts may be resorted to without departing from the spirit and scope of our invention as claimed.

We claim:

1. In combination with a kiln for heating glass a highly refractory, soft, finely divided, water soluble substance distributed over the floor of the kiln.

2. In combination with a kiln for heating glass a quantity of finely divided potassium sulphate distributed over the floor of the kiln.

3. In combination with a kiln for heating glass a quantity of finely divided magnesium sulphate distributed over the floor of the kiln.

4. In combination with a kiln for heating glass a quantity of finely divided sodium sulphate distributed over the floor of the kiln.

5. In combination in a kiln for heating glass, a refractory floor adapted to receive hot glassware and a layer of soft, finely pulverized, highly refractory, water soluble material covering the surface of said floor.

JESSE T. LITTLETON.
HOWARD R. LILLIE.
WILLIAM W. SHAVER.